(12) United States Patent
Rod

(10) Patent No.: US 12,088,073 B2
(45) Date of Patent: Sep. 10, 2024

(54) DRY-MATE WET-DESIGN BRANCH JOINT AND METHOD FOR REALIZING A SUBSEA DISTRIBUTION OF ELECTRIC POWER FOR WET CABLES

(71) Applicant: NEXANS, Courbevoie (FR)

(72) Inventor: Alf Erik Rod, Halden (NO)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 17/839,655

(22) Filed: Jun. 14, 2022

(65) Prior Publication Data

US 2023/0016785 A1 Jan. 19, 2023

(30) Foreign Application Priority Data

Jul. 2, 2021 (EP) .................................... 21305925

(51) Int. Cl.
*H02G 15/00* (2006.01)
*H01R 11/11* (2006.01)
*H02G 1/14* (2006.01)
*H02G 15/06* (2006.01)

(52) U.S. Cl.
CPC ............. *H02G 15/06* (2013.01); *H01R 11/11* (2013.01); *H02G 1/14* (2013.01)

(58) Field of Classification Search
CPC ........... H02G 15/06; H02G 1/14; H01R 11/11
See application file for complete search history.

(56) References Cited

U.S. PATENT DOCUMENTS

| | | | |
|---|---|---|---|
| 2007/0108201 A1* | 5/2007 | Vinegar | C10L 3/08 219/770 |
| 2009/0283295 A1* | 11/2009 | Varkey | D07B 1/162 174/105 R |
| 2012/0057979 A1* | 3/2012 | Schellstede | F03D 13/20 416/169 R |
| 2012/0266803 A1* | 10/2012 | Zediker | E21B 41/04 250/215 |
| 2014/0025319 A1* | 1/2014 | Farhadiroushan | E21B 47/007 702/56 |
| 2015/0378125 A1 | 12/2015 | Sales Casals | |
| 2016/0245868 A1* | 8/2016 | Hadler-Jacobsen | H02P 29/02 |
| 2016/0319798 A1* | 11/2016 | Blodgett | F03B 13/262 |
| 2017/0363069 A1* | 12/2017 | Hart | B64F 1/08 |

FOREIGN PATENT DOCUMENTS

| | | | | |
|---|---|---|---|---|
| EP | 2237380 | | 10/2010 | |
| EP | 2237380 A1 * | | 10/2010 | ........... H01R 13/523 |
| GP | 2586799 | | 3/2021 | |
| WO | WO-2009118505 A1 * | | 10/2009 | ............. G01V 15/00 |
| WO | WO-2021045627 A1 * | | 3/2021 | ............. F03D 13/10 |

OTHER PUBLICATIONS

66kv Submarine Cable system by Prsymian Group; see https://web.archive.org/web/20100501000000*/https://www.prysmiangroup.com/sites/default/files/business_markets/markets/downloads/datasheets/leaflet_submarine_epr_66%20Kv_%20final.pdf (Year: 2020).*
European Search Report dated Dec. 9, 2021.

* cited by examiner

*Primary Examiner* — Pete T Lee
(74) *Attorney, Agent, or Firm* — Sofer & Haroun, LLP (57) ABSTRACT

Termination assembly for three-phase high voltage submarine cable(s) (1a-c), has an open enclosure (10) with at least two cable lead-in (3a-c) located at one end (16) of the enclosure, at least six termination units (21-29) within the enclosure for receiving three phase conductors per cable, respectively.

15 Claims, 6 Drawing Sheets

DRY-MATE WET-DESIGN BRANCH JOINT AND METHOD FOR REALIZING A SUBSEA DISTRIBUTION OF ELECTRIC POWER FOR WET CABLES

RELATED APPLICATION

This application claims the benefit of priority from EP 21 305 925.6, filed on Jul. 2, 2021, the entirety of which is incorporated by reference.

OBJECTIVE OF THE INVENTION

The present invention in general relates to a dry-mate wet-design branch termination assembly and a method of subsea distribution of electric power.

BACKGROUND

In offshore operations there is often a need for distribution of electric power to or from a number of installations, with branching or splitting of cable systems, for example from several points along a main supply cable. A particularly interesting field of use for this invention is in offshore wind turbine parks. Another particularly interesting field of use for this invention is the electrification of multiple offshore platforms from land by one export cable.

Offshore installations like offshore wind driven turbine generators supply power to a collection station, which in turn supplies power ashore. This is achieved by means of submarine power cables. These submarine power cables are connected to the offshore installation on one end, lie on the seabed and are connected to another installation on the other end. The section where the cable lies on the seabed is called the static section. Between the offshore installation and the zone where the cable lies on the seabed, the cable is raised from the seabed and enters the offshore installation. This is in part due to the potential for localised scouring to occur near the structure. The section where the cable is raised from the seabed is called the dynamic section.

The offshore wind market is considered to raise normal common operating voltage from 36 kV to 72.5 kV and even to 145 kV levels for array cables, and export cables to shore may be designed for up to 245 kV.

Conventional cables at this voltage level use a water barrier made of lead, but these cables are not well adapted to be utilized in a dynamic situation, i.e. as experienced in the dynamic section, due to poor performance. In this dynamic section the cable is subjected to loads from waves, current and movements of the offshore installation. These loads cause variations in tension and curvature in the cable that may generate fatigue damage in the various cable components, especially in metallic water barrier.

A cable of a dry design is a cable with a water barrier such as an extruded lead sheath or other metal barriers over the insulation A cable of a semi-wet/semi-dry design, referred to as a semi-wet design, is a cable with a polymer (e.g. PE) sheath over a non-fully impervious metallic screen (e.g. metal tapes or thermoglued foils).

A cable of a wet design is a cable without any polymeric sheath over a non-fully impervious metallic screen (e.g. metal tapes) or without a metallic screen.

Cables adapted for the dynamic sections will have a wet design, or alternatively a semi-wet design.

Today there is no subsea solution available for connecting wet or semi-wet design cables from individual wind turbines and wave turbines together and further to a larger or main cable connecting the whole plant to an onshore power network. The prior art solution to this problem are dry-mate dry-design joints that underline the importance of the water tightness of said joint. This water tightness would be compromised by the water ingress in these wet or semi-wet cables.

It would be highly desirable in plants or parks of the above type to be able to provide for the required interconnections or terminations in wet or semi-wet design cable compatible assemblies normally located on or near the seabed, or at least well immerged below the sea surface so as not to interfere with surface operations and to avoid many riser cables extending to platforms or wind turbine structures above sea level. Problems encountered in that connection involve deployment of cables and equipment concerned, as well as the need for retrieval in case of repair and maintenance. From time to time there may also be a need for changing or disconnecting the established cable connections, for example when a wind turbine needs service or maintenance.

SUMMARY OF THE INVENTION

Thus, according to this invention there is provided a dry-mate wet-design branch joint and a method of subsea distribution of electric power a method of subsea distribution of electric power for wet-design cables from a number of wind turbines to consumers onshore.

A component or unit of particular interest here is a type of T-connectors, being configured substantially in the shape of a "T". One example of such a unit is the T-connector supplied by Euromold® (a Nexans company). Such T-connectors are used with great advantage in the present termination assembly, since their plug-in functionality makes possible relatively easy removal, replacement or addition of cable connections that may be required in the offshore installations and operations concerned.

A special advantage is obtained with this invention in the case of offshore floating wind turbines since there will be a need for only one dynamic (riser) cable to each wind turbine.

The present invention is defined by the appended claims and in the following:

In a first aspect, the invention relates to a termination assembly for three-phase high voltage submarine cable(s), comprising
  an open enclosure with at least two cable lead-ins located at one end of the enclosure, and
  at least three termination units within said enclosure for connecting three phase conductors per cable.

In the present specification, the term "open enclosure" is intended to mean a non-watertight enclosure, in the sense that the enclosure will be flooded when arranged under water. Here connecting is intended to mean electrically connecting.

In an embodiment, the enclosure may interconnect or terminate two to ten, two to five, three to five, three, four or five three-phase high voltage submarine cables.

In an embodiment, the enclosure may comprise at least one aperture in order to ease the flooding of the enclosure.

In an embodiment, the at least one aperture may be a hole or a slit on a wall of the housing.

In an embodiment, the termination assembly may be fully saturated with water. The cables connected to the assembly may also be fully saturated with water.

In an embodiment, the enclosure may be open by allowing water ingress at or around the cable lead-in.

In an embodiment of the invention, the assembly may also comprise:

lifting means located on the enclosure at an opposite end in relation to said lead-in(s).

The lifting means may be any suitable structure allowing easy lifting of the termination assembly, such as a lifting eye or at least one handle.

In another embodiment of the invention, the termination units may be of wet design. In another embodiment of the invention, the termination units may be fully saturated with water In another embodiment of the invention, the termination units may be T-connectors.

In another embodiment of the invention, the T-connectors may be oriented within said enclosure with their central legs extending substantially in a direction between said one and opposite ends.

In another embodiment of the invention, the dimensions of the enclosure may be largest in said direction.

In another embodiment of the invention, the assembly may be suitable for a branching connection of cables, wherein at least three cable lead-ins may be provided, and said enclosure comprises nine T-connectors.

In another embodiment of the invention, three T-connectors for one phase conductor may be mounted directly interconnected on a common supporting bracket.

In a second aspect, the invention relates to a method of subsea distribution of electric power from a plurality of wind turbines to one or more consumers, the method comprising the steps of:

connecting the plurality of wind turbines to a cable that is connected to a termination assembly for three-phase high voltage submarine cables comprising:
an open enclosure with at least two cable lead-in means for entry of each cable into the enclosure, and
at least six termination units within said enclosure for receiving three phase conductors per cable, respectively,
connecting at least another cable to said termination assembly, the at least another cable forming at least part of a main cable for supplying produced electric energy from the plurality of wind turbines to one or more consumers.

In an embodiment of the second aspect of the invention, the produced electric energy may be supplied to the one or more consumer through a collecting platform or a collecting central wind turbine, in order to electrically connect each phase of each of the plurality of wind turbine cable to each corresponding phase of the at least another cable.

In an embodiment of the second aspect of the invention, the method may comprise a step of lowering the termination assembly under water where the enclosure is flooded with water.

In another embodiment, the terminal assembly may further comprise lifting means located on the enclosure at an opposite end in relation to said lead-in means, In another embodiment, the termination units may be T-connectors.

In another embodiment, the T-connectors may be oriented within said enclosure with their central legs extending substantially in a direction between said one and opposite ends.

In another embodiment, the dimensions of said enclosure may be largest in said direction.

In another embodiment, three T-connectors for one phase conductor may be mounted directly interconnected on a common supporting bracket.

In another embodiment, wherein the wind turbines may be offshore floating wind turbines or types of floating or ground mounted platforms or wind turbines.

In an embodiment of the termination assembly according to the first aspect of the invention or of the method according to the second aspect of the invention, each cable may be of wet or semi-wet design.

In another embodiment of the termination assembly according to the first aspect of the invention or of the method according to the second aspect of the invention, each cable may advantageously be of wet design.

In another embodiment of the termination assembly according to the first aspect of the invention or of the method according to the second aspect of the invention, the terminal assembly may be dimensioned for voltages up to 245 kV, up to 145 kV, up to 72.5 kV or up to 36 kV.

In another embodiment of the termination assembly according to the first aspect of the invention or of the method according to the second aspect of the invention, the terminal assembly may be dimensioned for voltages over 12 kV, over 36 kV or over 72.5 kV.

In another embodiment of the termination assembly according to the first aspect of the invention or of the method according to the second aspect of the invention, the terminal assembly may be dimensioned for voltages over 12 kV and under 245 kV, or over 12 kV and under 145 kV, over 12 kV and under 72.5 kV or over 12 kV and under 36 kV.

In another embodiment of the termination assembly according to the first aspect of the invention or of the method according to the second aspect of the invention, the terminal assembly may be dimensioned for voltages over 36 kV and under 245 kV, or over 36 kV and under 145 kV or over 36 kV and under 72.5 kV.

BRIEF DESCRIPTION OF THE DRAWINGS

In the following description this invention will be further explained by way of exemplary embodiments shown in the drawings.

DETAILED DESCRIPTION OF THE INVENTION

Figure 1:
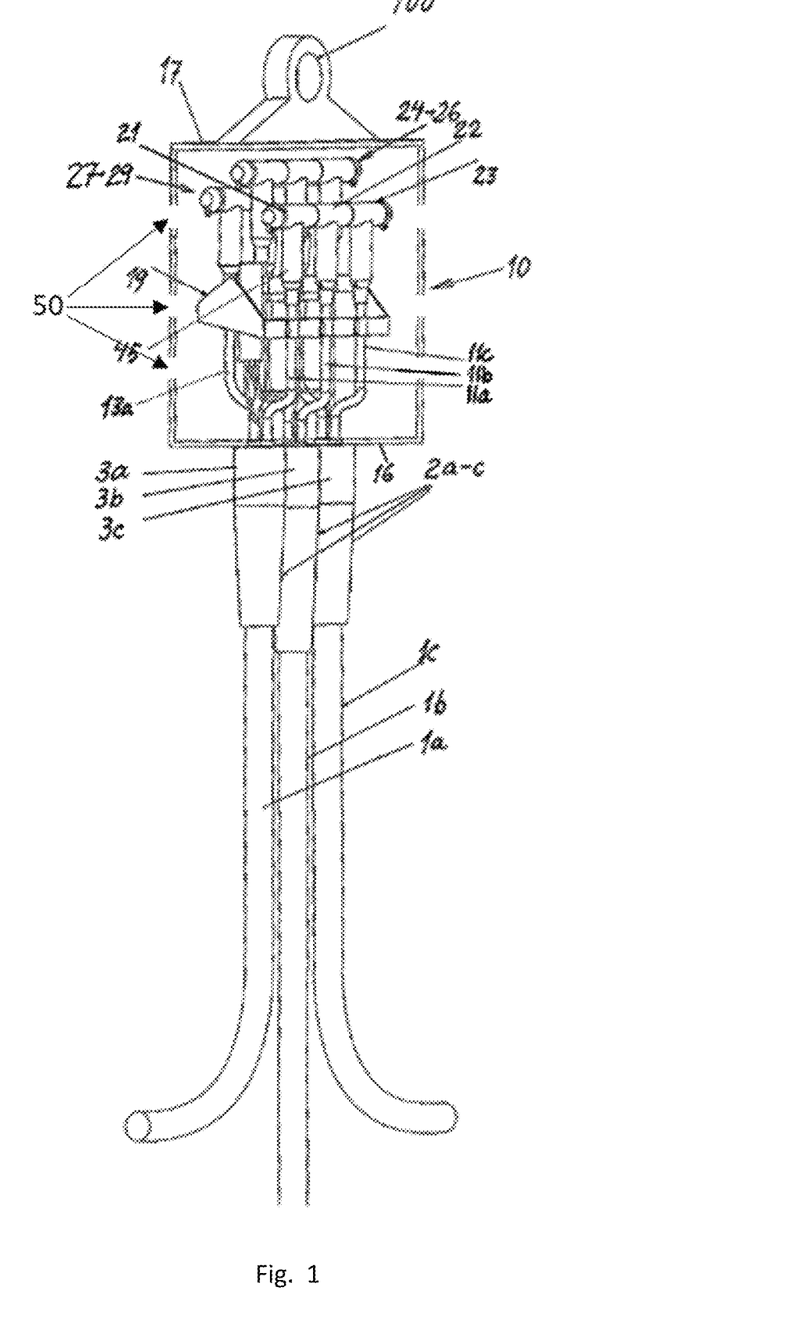
FIG. 1 is a cross-sectional and perspective view of a termination assembly according to the invention.

The embodiment of FIG. 1 discloses interconnecting three submarine power cables 1a, 1b and 1c. Thus, cables 1a and 1c, may belong to a main cable for supplying produced electric energy from a number of wind turbines to consumers on-shore. Cable 1b may be connected to a wind turbine in the system. What is done at this point in the system is to electrically connect each phase of the three-phase cable 1b to each corresponding phase of cable(s) 1a and 1c. This takes place inside an enclosure 10 shown in FIG. 1 (and FIGS. 2, 4a and 4b). The enclosure 10 may advantageously comprise at least one aperture 50 in order to ease the flooding of the enclosure 10. The at least one aperture 50 may be a hole or a slit. The enclosure 10 will be flooded when placed under the sea level. Before entering enclosure 10, the cables 1a-c are each surrounded by a bend stiffener or a bend restrictor 2a-c, respectively, according to known methods. Moreover, lead-in means 3a-c for entry of each cable into the enclosure are provided, also as known per se. Preferably, the lead-ins are not sealed in a water-tight manner to the enclosure, such that water may easily enter the enclosure when submerged in water.

The enclosure 10 may be a in the shape of a splitable box, such as a square box or a cylindrical box, for ease of access for installation of power cables.

Inside the enclosure 10 there are three groups of T-connectors 21-23, 24-26 and 27-29, respectively, supported by a bracket 19. T-connectors 21-23 are shown more detailed in FIG. 2, i.e. for one (corresponding) phase 11a, 11b and 11c from respective cables 1a-c. The similar arrangements are provided for connecting the other two cable phases by means of groups 24-26 and 27-29, respectively, of T-connectors.

Figure 2:
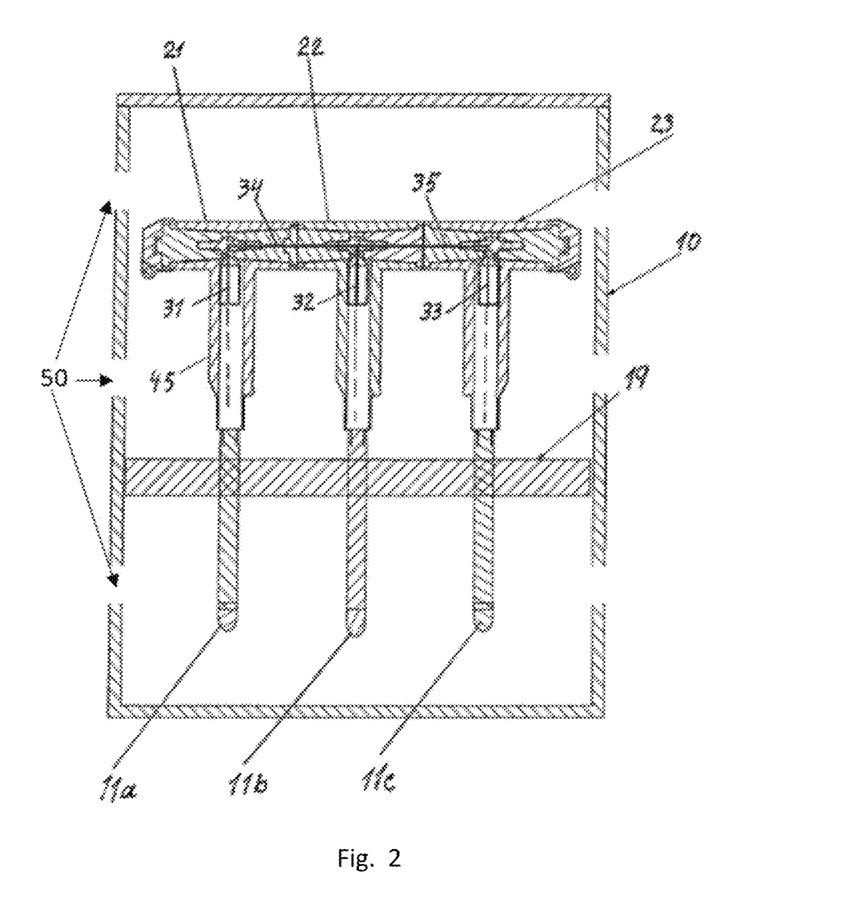
FIG. 2 is an enlarged cross-sectional view of three T-connectors assembled within an enclosure, corresponding to parts of FIG. 1.

As will be seen from FIG. 2, T-connectors 21, 22 and 23 are directly attached to one another by plugging together at their upper or transverse legs with a through-running electrically conductive path comprising conducting elements 34 and 35. In this manner conductors 31, 32 and 33 belonging to cable phases 11a, 11b and 11c, respectively, are connected together. Looking again at FIG. 1, there is shown one phase 13a from cable 1a, being extended to T-connector 27 in the third or rear group of T-connectors.

Figure 5A:
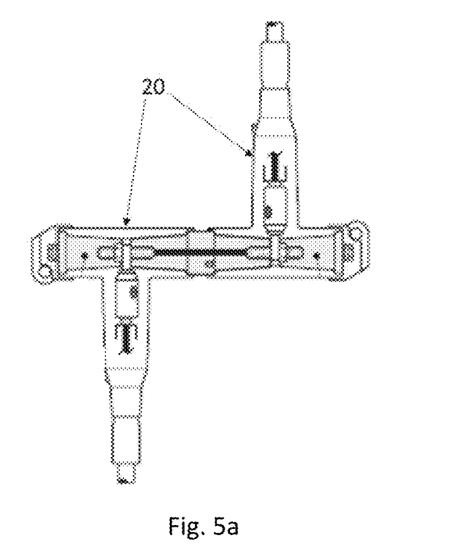
FIG. 5a is an enlarged cross-sectional view of two T-connectors assembled for use in a specific embodiment of this invention.
Figure 5B:
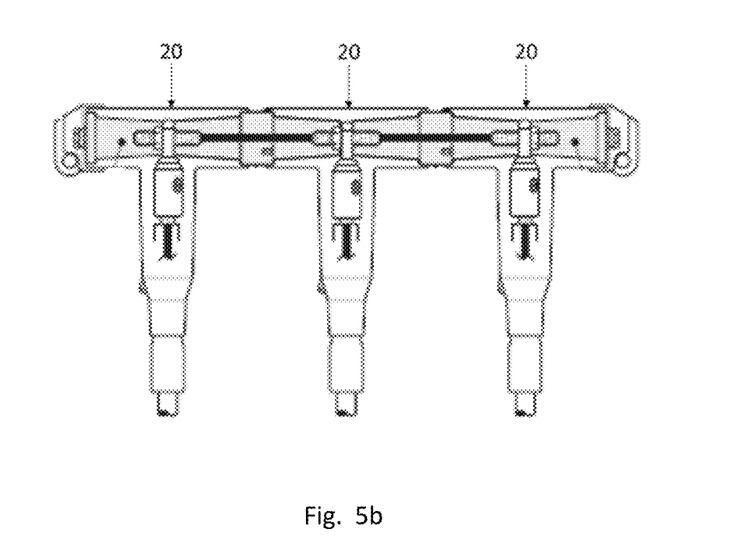
FIG. 5b is an enlarged cross-sectional view of three T-connectors assembled for use in a specific embodiment of this invention.
Figure 5C:
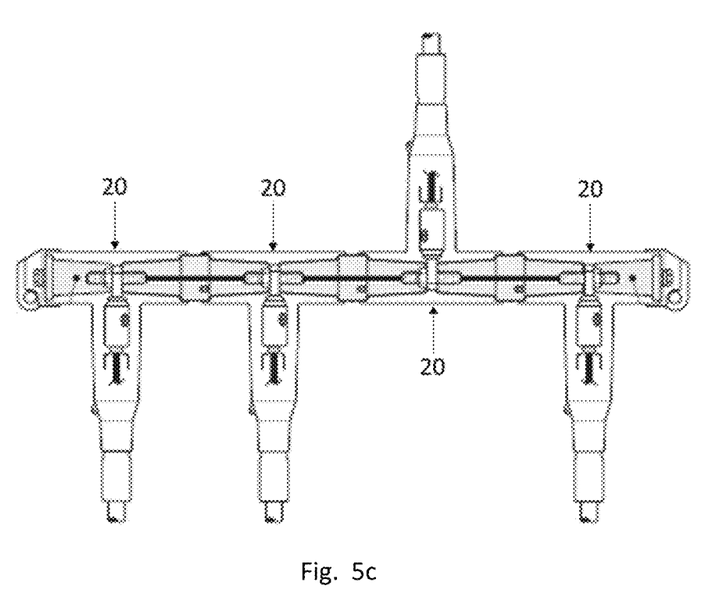
FIG. 5c is an enlarged cross-sectional view of four T-connectors assembled for use in a specific embodiment of this invention.

The central or main leg 45 is indicated for T-connector 21, with all other T-connectors having the same kind of central leg, all such central legs being oriented vertically as shown in the drawings. The T-connectors can also rotate so as to be opposed to each other 180 degrees along the "34 axis", as illustrated in FIGS. 5a-c. This of course does not mean that in actual service this orientation is normal. It is to be noted also that in the embodiment shown in FIG. 1, the axial direction of power of cables 1a-c, as well as the bend stiffeners or bend restrictors 2a-c is generally the same as for the above central or main legs 45. In actual practice this is a very advantage arrangement, facilitating the assembling operations as well as any repair or changes to be made during the lifetime of the termination assembly.

Lead-ins 3a-c are provided at one end or side wall 16 of enclosure 10. The opposite end or side wall is denoted 17. At the end 17 there is provided lifting means in the form of an eye structure 100 making possible deployment as well as retrieval of the whole assembly with power cables 1a-c connected thereto. It will be understood that depending on water depth at the site of installation, there may be a quite considerable weight to be carried by lifting eye 100 during such operations. In many cases it may be considered advantageous to have the dimensions of enclosure 10 to be largest in a direction between the end or side walls 16 and 17, and also to have the central legs 45 of the T-connectors mounted to extend substantially in the longitudinal direction of the enclosure, i.e. more or less in parallel to the direction of cables 1a-c when entering the enclosure through bend the stiffeners or bend restrictors 2a-c and lead-ins 3a-c.

Although FIG. 1 illustrates the important case of three electric power cables 1a-c interconnected within enclosure 10, alternatives with at least two three-phase high voltage submarine cables, especially alternatives with two to ten three-phase high voltage submarine cables fall within the scope of the invention.

An embodiment of the invention with two termination units 20, such as T-connectors is illustrated in FIG. 5a, an embodiment of the invention with three termination units 20, such as T-connectors is illustrated in FIG. 5b and an embodiment of the invention with four termination units 20, such as T-connectors is illustrated in FIG. 5c.

Figure 3:
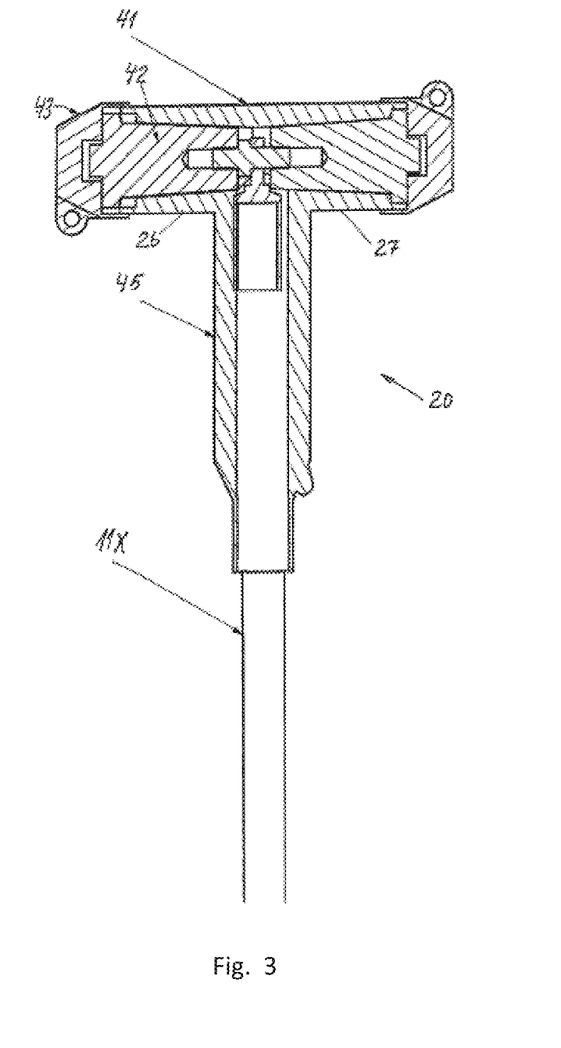
FIG. 3 is a still more enlarged and detailed cross-section of a T-connector for use in a specific embodiment of this invention.

A still more simplified arrangement is illustrated in FIG. 3, where a single phase of cable 1x is connected to T-connector 20 with a similar kind of central leg 45 as in the above embodiment, and with two transverse legs 26 and 27, to serve only as a termination and insulation of cable 1x. Thus, a common cylindrical housing 41 of insulating material and insulating plugs 42 as well as rubber caps 43 provide for the required insulation and termination. This is particularly useful for testing purposes, which may be a quite important operation during installation of submarine cables. For this purpose, it may be sufficient to have just one cable lead-in and three termination units or T-connectors for testing of a three-phase high voltage submarine cable.

Figure 4A:
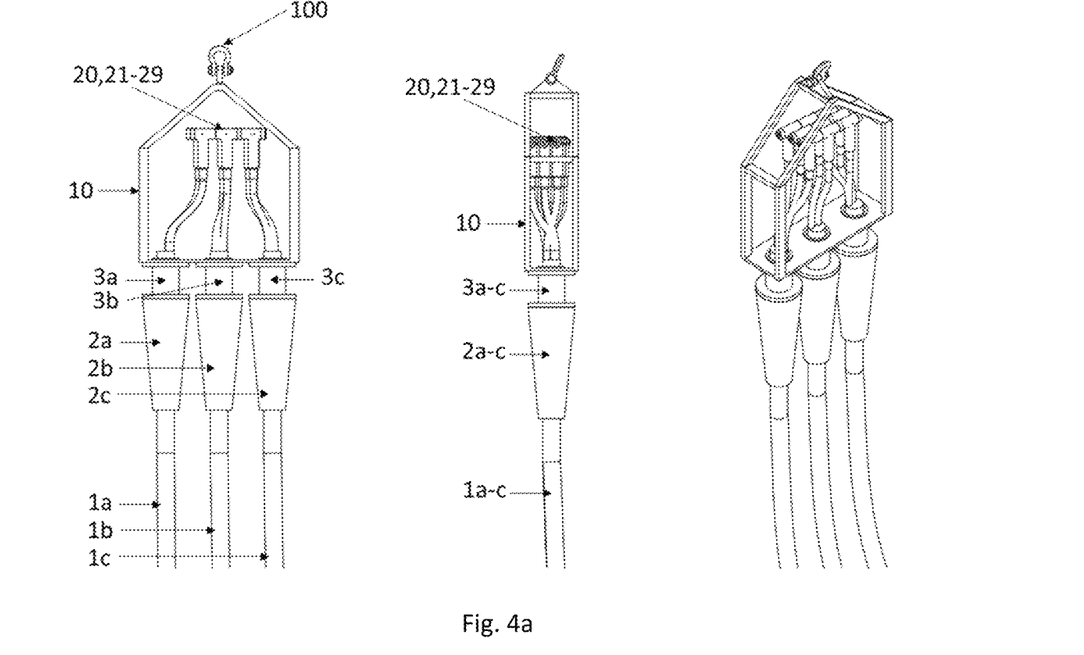
FIG. 4a is a front side view, a lateral view and a perspective view of the open terminal assembly.
Figure 4B:
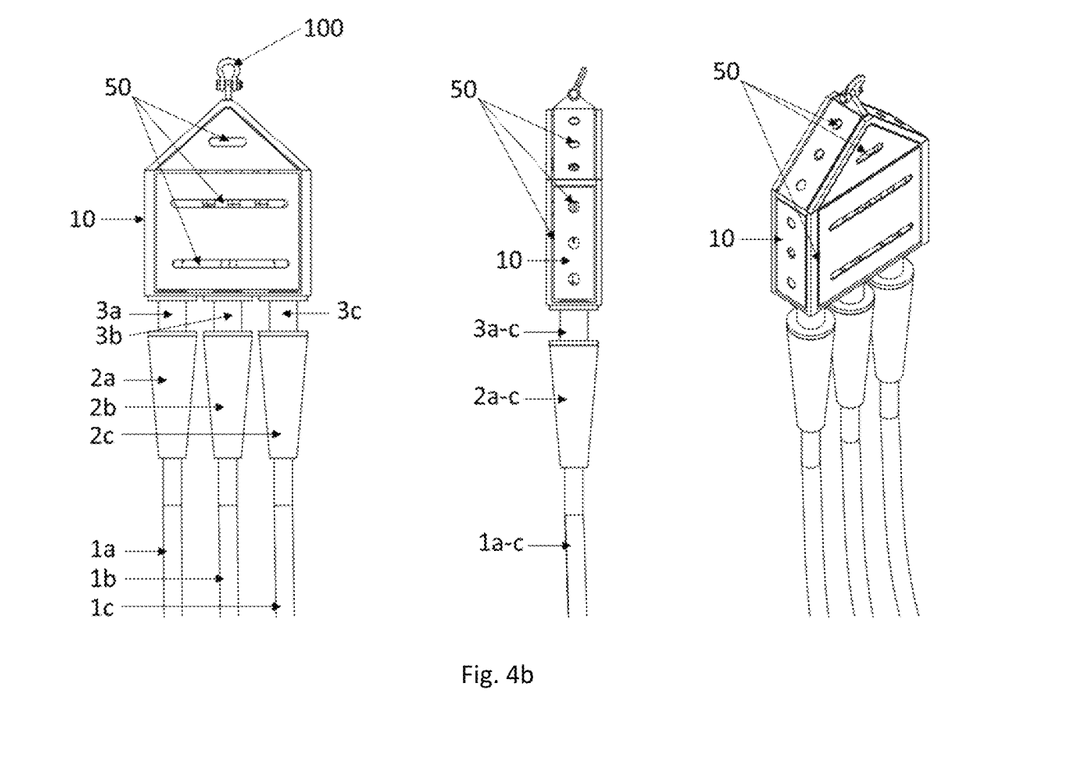
FIG. 4b is a front side view, a lateral view and a perspective view of the closed terminal assembly.

FIGS. 4a and 4b show different views of the open (FIG. 4a) and closed (FIG. 4b) terminal assembly. In particular these figures show an embodiment of the at least one aperture 50 exemplified here by a series of holes and slits on the side walls of the housing 10. These apertures 50 will advantageously help with flooding the housing 10 when the housing 10 is put under the water level.

The invention claimed is:

1. A termination assembly and three-phase high voltage submarine cables, said termination assembly and three-phase high voltage submarine cables comprising:
    an enclosure with at least two cable lead-ins located at one end of the enclosure, said lead-ins are not sealed in a water-tight manner to the enclosure, such that water may easily enter the enclosure when submerged in water; and
    at least three termination units within said enclosure for connecting three phase conductors per high voltage submarine cable,
    wherein said three-phase high voltage submarine cables are either one of a semi-wet design, having a polymer sheath over a non-fully impervious metallic screen, or a wet design, without any polymeric sheath over a non-fully impervious metallic screen or without a metallic screen, and
    wherein the enclosure is an open enclosure.

2. The termination assembly and three-phase high voltage submarine cables according to claim 1, wherein the enclosure comprises at least one aperture to facilitate flooding.

3. The termination assembly and three-phase high voltage submarine cables according to claim 1, comprising:
    lifting means located on the enclosure at an opposite end in relation to said lead-in(s).

4. The termination assembly and three-phase high voltage submarine cables according to claim 1, wherein said termination units are T-connectors.

5. The termination assembly and three-phase high voltage submarine cables according to claim 4, wherein said T-connectors are oriented within said enclosure with their central legs extending substantially in a direction between said one and opposite ends.

6. The termination assembly and three-phase high voltage submarine cables according to claim 5, wherein the dimensions of said enclosure are largest in said direction.

7. The termination assembly and three-phase high voltage submarine cables according to claim 1 for a branching connection of cables, wherein three cable lead-ins are provided within said enclosure.

8. The termination assembly and three-phase high voltage submarine cables according to claim 4, wherein three T-connectors for one phase conductor are mounted directly interconnected on a common supporting bracket.

9. A method of subsea distribution of electric power from a plurality of wind turbines to one or more consumers, comprising:
connecting the plurality of wind turbines to a cable that is connected to a termination assembly and three-phase high voltage submarine cables, the termination assembly and three-phase high voltage submarine cables comprising:
an enclosure with two cable lead-in means for entry of each cable into the enclosure, said lead-ins are not sealed in a water-tight manner to the enclosure, such that water may easily enter the enclosure when submerged in water, and
at least six termination units within said enclosure for receiving three phase conductors per high voltage submarine cable, respectively,
wherein said three-phase high voltage submarine cables are either one of a semi-wet design, having a polymer sheath over a non-fully impervious metallic screen, or a wet design, without any polymeric sheath over a non-fully impervious metallic screen and/or without a metallic screen, and
wherein the enclosure is an open enclosure, and
connecting at least another cable to said termination assembly, the at least another cable forming at least part of a main cable for supplying produced electric energy from the plurality of wind turbines to one or more consumers.

10. The method according to claim 9, wherein the enclosure comprises at least one aperture to facilitate flooding.

11. The method according to claim 9, further comprising a step of lowering the termination assembly under water where the enclosure is flooded with water.

12. The method according to claim 9, wherein the termination assembly comprises lifting means located on the enclosure at an opposite end in relation to said lead-in means.

13. The method according to claim 9, wherein said termination units are T-connectors.

14. The method according to claim 13, wherein three T-connectors for one phase conductor are mounted directly interconnected on a common supporting bracket.

15. The method according to claim 9, wherein the wind turbines are offshore floating wind turbines or types of floating or ground mounted platforms or wind turbines.

* * * * *